United States Patent [19]

Wickstead et al.

[11] Patent Number: 4,764,763
[45] Date of Patent: Aug. 16, 1988

[54] ELECTRONIC SKETCHING DEVICE

[75] Inventors: James C. Wickstead, Mendham; Gerald P. Selden, Blairstown, both of N.J.

[73] Assignee: The Ohio Art Company, Bryan, Ohio

[21] Appl. No.: 808,919

[22] Filed: Dec. 13, 1985

[51] Int. Cl.[4] .............................................. G09G 1/00
[52] U.S. Cl. .................................... 340/709; 340/725
[58] Field of Search ............... 340/709, 710, 723, 724, 340/725, 791, 784, 792, 707, 708, 706, 334 E, 721; 250/229

[56] References Cited

U.S. PATENT DOCUMENTS

| | | | |
|---|---|---|---|
| 3,702,070 | 11/1972 | Gartner | 250/229 |
| 3,731,299 | 5/1973 | Bouchard et al. | 340/709 |
| 3,739,347 | 6/1973 | Forsberg | 340/709 |
| 3,766,528 | 10/1973 | Ichida | 340/725 |
| 3,778,058 | 12/1973 | Rausch | 340/725 |
| 3,809,395 | 5/1974 | Allison et al. | 340/709 |
| 3,892,963 | 7/1975 | Hawley et al. | 340/710 |
| 4,045,789 | 8/1977 | Bristow | 340/725 |
| 4,116,444 | 9/1978 | Mayer et al. | 340/709 |
| 4,121,283 | 10/1978 | Walker | 340/721 |
| 4,200,867 | 4/1980 | Hill | 340/709 |
| 4,324,401 | 4/1982 | Stubben et al. | 340/725 |
| 4,334,280 | 6/1982 | McDonald | 340/384 E |
| 4,355,805 | 10/1982 | Baer et al. | 340/709 |
| 4,359,222 | 11/1982 | Smith et al. | 340/725 |
| 4,365,242 | 12/1982 | Yasuda et al. | 340/709 |
| 4,425,559 | 1/1984 | Sherman | 340/747 |
| 4,493,992 | 1/1985 | Geller | 340/709 |
| 4,500,875 | 2/1985 | Schmitz | 340/703 |
| 4,600,919 | 7/1986 | Stern | 340/725 |

OTHER PUBLICATIONS

Microsoft Corporation, "Microsoft Paintbrush User's Guide", 1986, pp. 5–9, 91–93 and 99–106.

Primary Examiner—John W. Caldwell, Sr.
Assistant Examiner—Alvin Oberley
Attorney, Agent, or Firm—Blum Kaplan

[57] ABSTRACT

An electronic sketching device. The electronic sketching device includes a display for providing a visual representation of a sketch on a display area. The electronic sketching device also including a cursor controller for moving a cursor on the display and a sketch controller for selectively storing the placement of the cursor on the display area as a pixel to create a sketch on the display area. A storage device, which is coupled to the sketch controller, stores a plurality of sketches. The electronic sketching device also contains a sketch memory for creating and storing a sequence of sketches which is coupled to the storage device. An animater, coupled to the storage device, sketch memory and the display, causes the stored sequence of sketches to be sequentially displayed on the display.

14 Claims, 7 Drawing Sheets

ELECTRONIC SKETCHING DEVICE

BACKGROUND OF THE INVENTION

The invention is generally directed to an electronic sketching device and in particular to a computer controlled drawing system capable of highly involved electronic sketching and animation of sketches, yet simple to use by even children.

In the past there have been hand held sketching devices which allow for the sketching of a single drawing on a "screen". The ETCH-A-SKETCH® drawing game produced by Ohio Art Company is an example of a portable sketching device. In addition, there have been crude electronic animators such as is shown in U.S. Pat. No. 3,766,528. However, the crude animators are both difficult to use and have limited animation capacity.

Accordingly, there is a need for an electronic sketching device with sophisticated drawing and animation features which is both easy to use and can provide satisfactorily detailed drawings.

SUMMARY OF THE INVENTION

The invention is generally directed to an electronic sketching device. The electronic sketching device includes a display for providing a visual representation of the sketch on a display area. The electronic sketching device also includes a cursor controller for moving the cursor on the display and a sketch controller for selectively storing the placement of the cursor on a display area as a pixel to create a sketch on the display area. A storage device, which is coupled to the sketch controller, stores a plurality of sketches. The electronic sketching device also contains a sketch memory for creating and storing a sequence of sketches which is coupled to the storage device. An animator, coupled to the storage device, sketch memory and the display, causes the stored sequence of sketches to be sequentially displayed on the display.

Accordingly, it is an object of the invention to provide an improved electronic sketching device for generating a visual display of a drawing sketched on the electronic sketching device.

Another object of the invention is to provide an improved electronic sketching device capable of storing a group of sketched drawings and displaying these saved drawings in an animation sequence.

A further object of the invention is to provide an electronic sketching device with a liquid crystal display adapted to display sketched drawings and animated sequences of stored drawings.

Yet another object of the invention is to provide an electronic sketching device with a cursor controlled by two knobs, one of which controls movement of the cursor in the X-direction and the other controls movement of the cursor in the Y-direction.

Still another object of the invention is to provide an electronic sketching device with X-direction and Y-direction movement knobs utilizing separate infrared interrupter assemblies to move a cursor on the screen for drawing purposes.

Yet a further object of the invention is to provide an electronic sketching device with animation including function keys for activating or deactivating a cursor for drawing purposes and a reverse image function for reversing the background and in its colors.

Still a further object of the invention is to provide an electronic sketching device with frame management features capable of creating and displaying varying sequences of display screens.

Yet a further object of the invention is to provide an electronic sketching device which automatically shifts to a semi-dormant state after a preset time during which no user activity is present to conserve power.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawing, in which.

DETAILED DESCRIPTION OF THE PREFERRED EMBODIMENTS

Reference is made to FIGS. 1-4 wherein an electronic sketching device, generally indicated as 100, constructed in accordance with the invention is depicted. Electronic sketching device 100 has a liquid crystal display screen 101 which in a preferred embodiment is a 30×40 pixel dot matrix liquid crystal display with an overall size of approximately 3×4 inches. In a preferred embodiment the liquid crystal display uses a low viscosity medium speed liquid crystal and is strictly reflectively polarized. The 1 in 30 drive mode requires an input voltage range of at least ten volts. Other types of liquid crystal displays or alternative display mediums may be utilized.

Electronic sketching device 100 also has an upper case member 102 and a lower case member 103 (FIGS. 2, 3, 4) held together by screws 104. Upper case member 102 is formed with openings 102a through which two knobs 105, 106 for moving a cursor on the liquid crystal display extend. One of the knobs 105, 106 is used to move the cursor in a horizontal direction and the other knob is used to move the cursor in a vertical direction. Knobs 105, 106 rest on knob pins 107, which extend upwardly from the interior of lower case 103. Cavities 108 on the bottom surfaces of knobs 105, 106 are adapted to receive knob pins 107 therein and allow free rotation of knobs 105, 106. Each of knobs 105, 106 defines a knob-interrupter assembly 109, 110 which will be described below with respect to FIG. 5.

Figure 1:
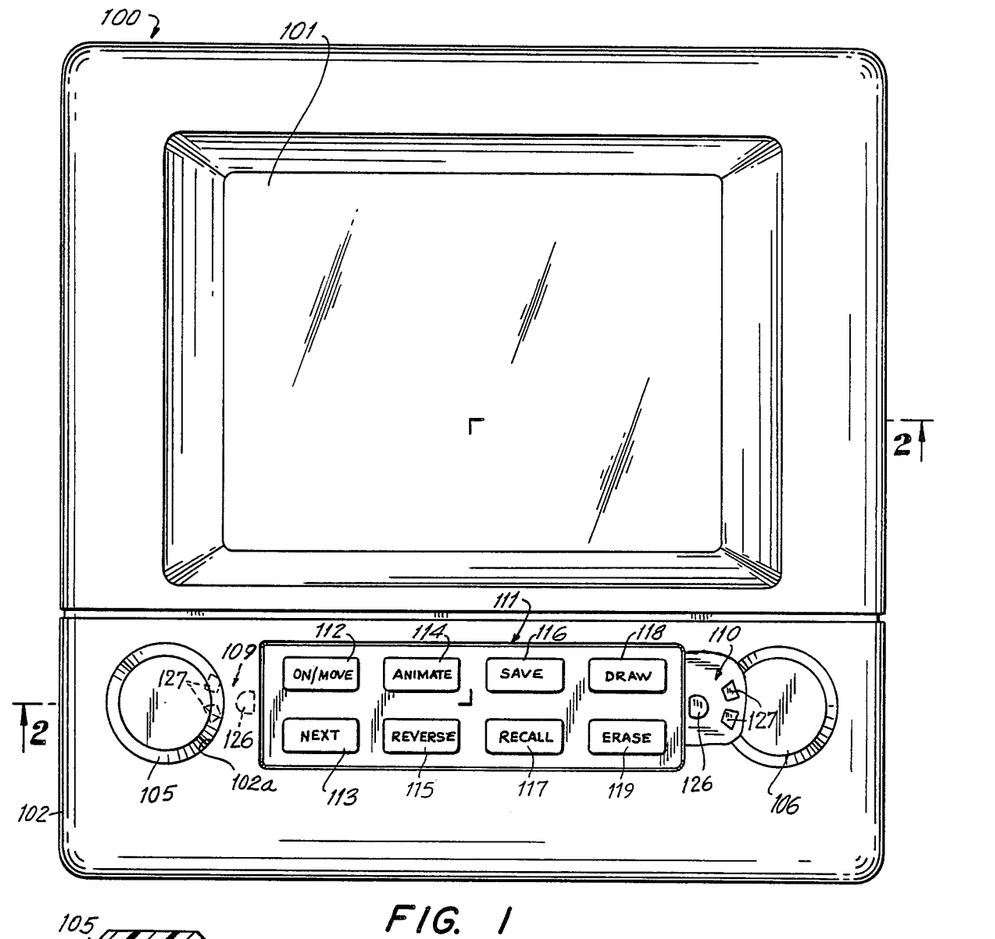
FIG. 1 is a partially cut away top plan view of an electronic sketching device constructed in accordance with the invention.
Figure 2:
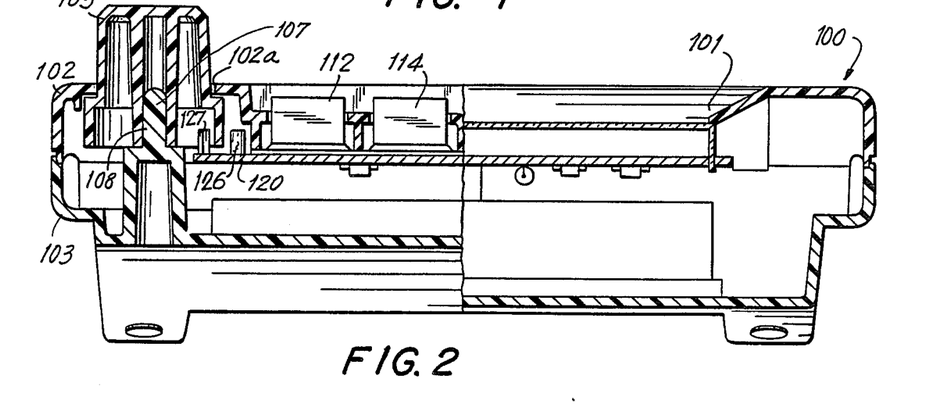
FIG. 2 is a cross-sectional view taken along line 2—2 of FIG. 1.
Figure 3:
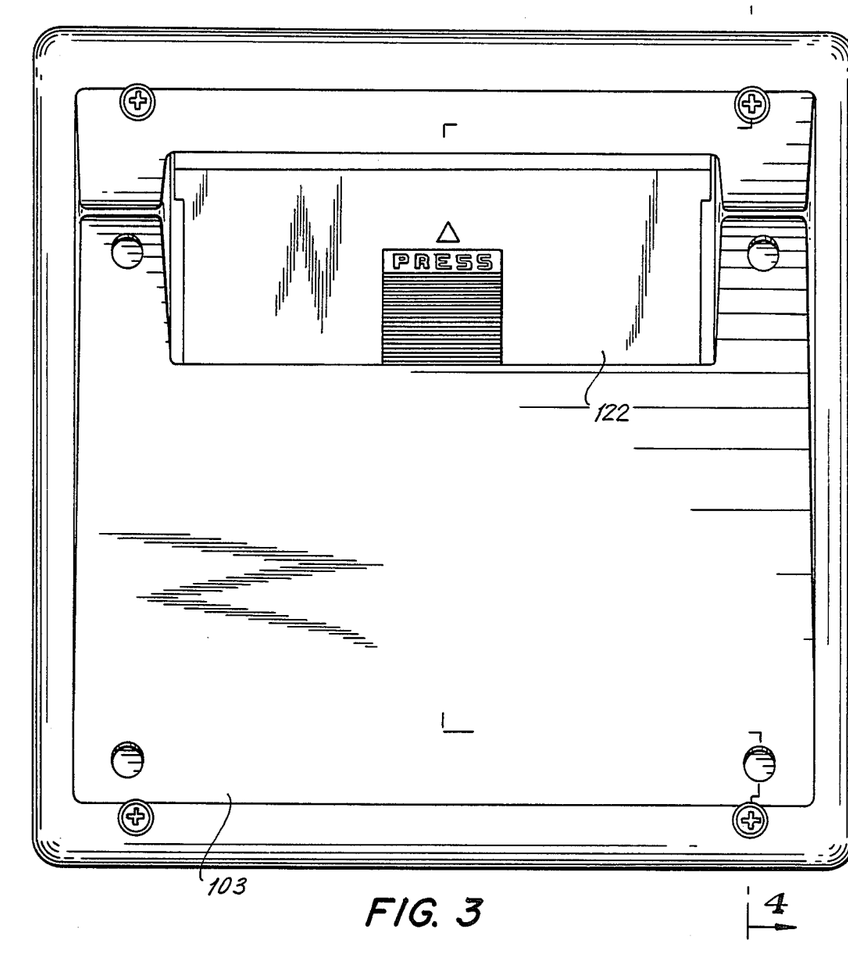
FIG. 3 is a bottom plan view of the electronic sketching device of FIG. 1.

Electronic sketching device 100 also has on the top or front panel thereof defined by upper case member 102, a keyboard 111 having eight separate keys 112–119. Keyboard 111 includes an ON/MOVE button 112, a NEXT button 113, an ANIMATE button 114, a REVERSE button 115, a SAVE button 116, a RECALL button 117, a DRAW button 118 and an ERASE button 119. The functioning of each of these buttons will be described below in connection with the description of FIGS. 8A, 8B. The buttons are supported on a PC board 120 supported within lower case member 103.

Figure 4:
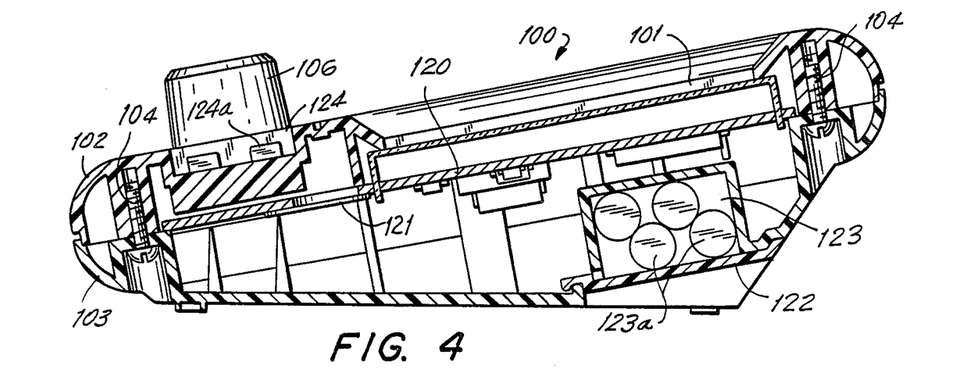
FIG. 4 is a cross-sectional view taken along line 4—4 of FIG. 3.

The electronic components of electronic sketching device 100 are contained on PC board 120. As seen in FIG. 4, a piezoelectric member 121 is attached to PC board 120. Piezoelectric member 121 is caused to vibrate at various frequencies by inputting an AC signal of varying frequency and amplitude in accordance with standard practice. As a result, tones of various frequencies are produced. In particular tones are generated when any of buttons 112–119 are pressed to provide the user with positive feedback of the actuation of a switch. In addition, the piezoelectric device can scale up or down in frequency for cursor movement up or down and left or right.

A battery compartment cover 122 (FIG. 3) is slidably removable from lower case member 103 to expose a battery compartment 123 (FIG. 4) containing batteries 123a for powering the device, the battery case being electrically coupled to PC board 120 in a conventional manner (not shown). While the device is adapted to be powered by batteries, electronic sketching device 100 may also be adapted to be coupled to an adapter for coupling to house current (110 volts) or alternative power sources.

Figure 5:
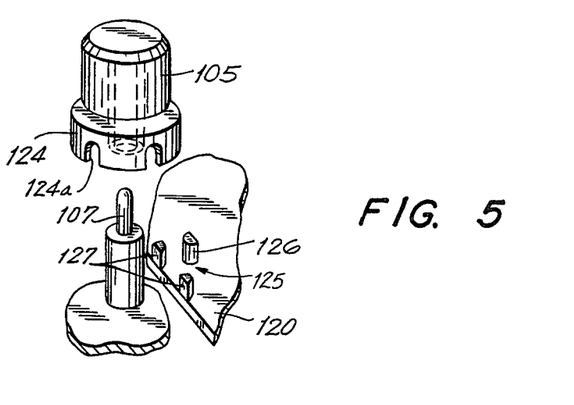
FIG. 5 is an exploded perspective view of a knob-interrupter assembly.

Reference is next made to FIG. 5 wherein a knob-interrupter assembly 109 constructed in accordance with the invention is depicted. Knob-interrupter assembly 109 (or 110) includes an interrupter portion 124 and a source-detector portion 125. Interrupter portion 124 is an opaque cup descending from each knob 105, 106 and formed with longitudinally extending slots 124a at regular intervals to selectively define or block light conductor paths for source-detector portion 125. Source-detector portion 125 includes an infrared source 126 mounted on one side of interrupter portion 124 and two detectors 127 mounted on the opposite side of interrupter portion 124. Source 126 and detectors 127 are mounted on PC board 120. As the knob is rotated a four code pattern is generated (see Table 1). First, one detector is activated; then both are activated; next, the other detector is activated and finally neither detector is activated. The input is interpreted by the central processor unit mounted on PC board 120 as a direction code, a movement code and a "X" or "Y" detector code. The movement of a cursor on screen 101, up or down, left or right is determined by which of the two detectors for each direction is activated first in the sequence.

TABLE 1

| Detector | Vertical Inter. | | Horizontal Inter. | | I.R Source | | Interp. |
|---|---|---|---|---|---|---|---|
| | XL | XR | YL | YR | IRX | IRY | |
| | Off | Off | Off | Off | On | Off | No Movement |
| | On | Off | Off | Off | On | Off | X clockwise Rot. no movement |
| | On | On | Off | Off | On | Off | X clockwise Rot. no movement |
| | Off | On | Off | Off | On | Off | X clockwise Rot. no movement |
| | Off | Off | Off | Off | On | Off | X clockwise Rot. No Y movement (move one pixel up) |
| | Off | Off | On | On | Off | On | No movement |

The amount of the movement is determined by the number of completed sequences, and finally, the direction of movement is determined by which of the pulse signals is present. As shown in Table 1, a sequence of four sampling points results in movement of the cursor. Repetitions of the sequence causes movement of the cursor in multiple number of spaces. The diameter of the interrupter portion determines the amount of displacement for each rotation of the interrupter portion. Thus, by providing interrupter portions of different diameters on knobs 105, 106, movement of the cursor along the X and Y axes of a rectangular screen can be scaled so that the same number of rotations of each knob results in deflection of the cursor the full length of the display in the associated direction. While the preferred embodiment includes one light source and two detectors, other combinations of light sources and detectors defining at least three detection elements may be provided.

Figure 6:
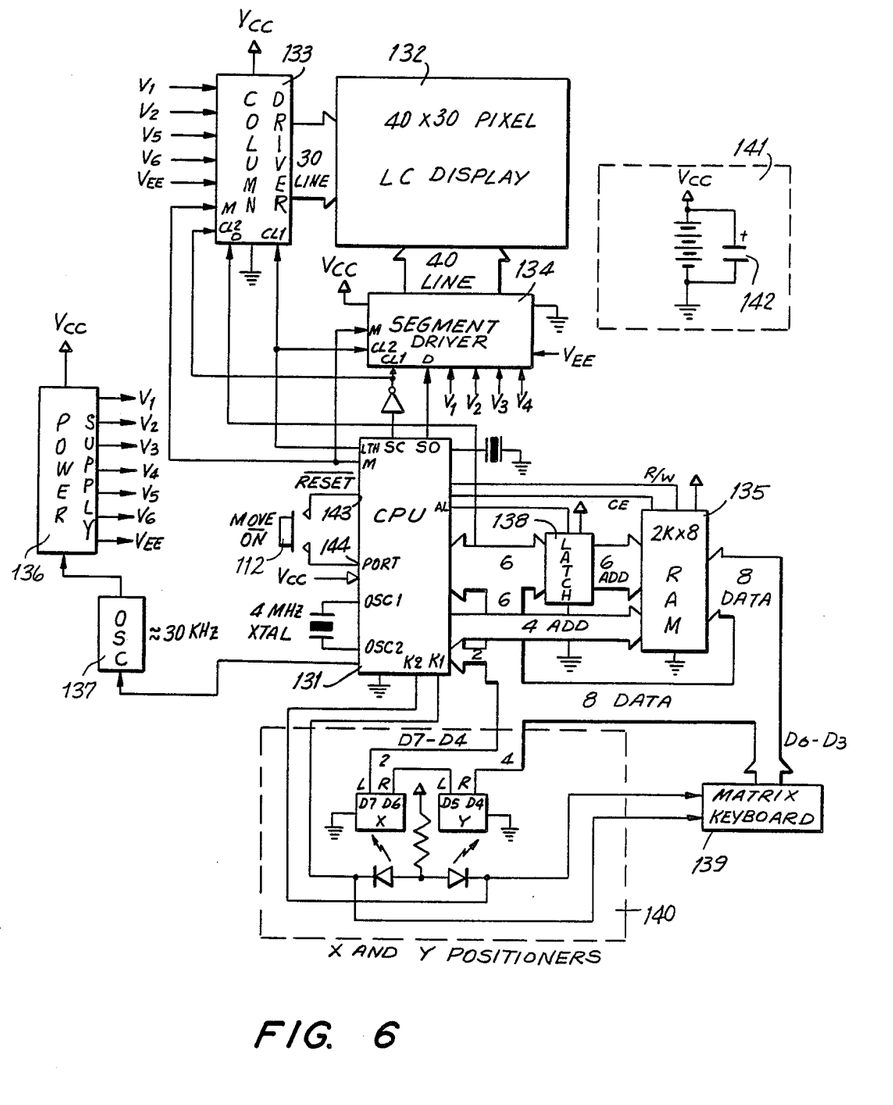
FIG. 6 is a block diagram of the electronic sketching device electronics.

Reference is next made to FIG. 6 wherein a simplified block diagram of the electronic circuit generally indicated as 130 constructed in accordance with a preferred embodiment of the invention is depicted. Electronic circuit 130 includes a central processing unit (CPU) 131, a 40×30 pixel LC display 132, column and segment liquid crystal display drivers 133, 134, a two kilobyte static RAM 135, a power supply 136, oscillator 137, data latch 138, matrix keyboard 139, X and Y positioners 140 and a voltage source ($V_{CC}$) 141.

Voltage source ($V_{CC}$) is produced in a preferred embodiment by four AA batteries in parallel with a large capacitor 142. In a preferred embodiment capacitor 142 has a capacitance of 1 $\mu$F. The voltage $V_{CC}$ is used as an input for power supply 136. In addition, the output of oscillator 137 in a preferred embodiment generates an output signal of the frequency of approximately 30 kHz. Power supply 136 generates voltages $V_1$–$V_6$ and $V_{EE}$. These output voltages are used to power column driver 133 and segment driver 134. CPU 131 is driven by $V_{CC}$ as are RAM 135 and data latch 138.

In a preferred embodiment CPU 131 is a small four bit organized processor such as an LC 6523 A processor. The processor has twenty-five selectable I/O ports, a two kilobyte on board ROM and a 128×4 bit RAM. The processor does not have a sufficient number of ports to handle the required timing control for input/output and bus sharing is required. Because an additional 2K RAM 135 is used, a 6 bit data latch 138 is incorporated to set part of the address. CPU 131 has several pin outs which are indicated in FIG. 6. These include SO which is a serial data outline, SC which is a shift clock which shifts data in the driver register, LTH which is an output latch signal, M which is a master shift clock for the display shift, AL which is an address latch for the RAM and CL1, CL2 which are the shift clock for data in and latch clock for display out, respectively.

2K static RAM may be a 2K×8 static random access memory. The processor is a four bit device. Therefore, the address line are grouped in four bit groups. Six of the upper address bits are latched into the RAM and the same six ports used for the address bits are used to either transmit data to or from the RAM. The lower four data ports are used for key matrix input to the CPU and are shared by the RAM. The keyboard matrix 139 is isolated from the RAM by means of the divided resistor pull up system and by use of proper port timing (see discussion below of FIG. 7). The upper four data ports are shared with the outputs from X and Y positioners (knob-interrupter assemblies) 140. In this case no pull-up resistors are necessary because the outputs of the knobs are only read under the control of CPU 131. RAM 135 stores pixel by pixel (1200 pixels) in a single frame up to twelve frames and animation sequences of up to ninety-six combinations of the twelve stored frames.

Matrix keyboard 139 is a 2×4 matrix which allows the use of up to eight buttons. However, in this device only seven of the eight possible positions in the 2×4 matrix are used. The eighth button on the front panel, (ON/MOVE key 112) is separate from the matrix and uses a preset I/O line from the CPU. When CPU 131 is in the quiescent or OFF mode pressing MOVE/ON button 112 pulls down reset port 143. At all other times when MOVE/ON button 112 is depressed I/O port 144 is pulsed low which triggers the MOVE routine.

Figure 7:
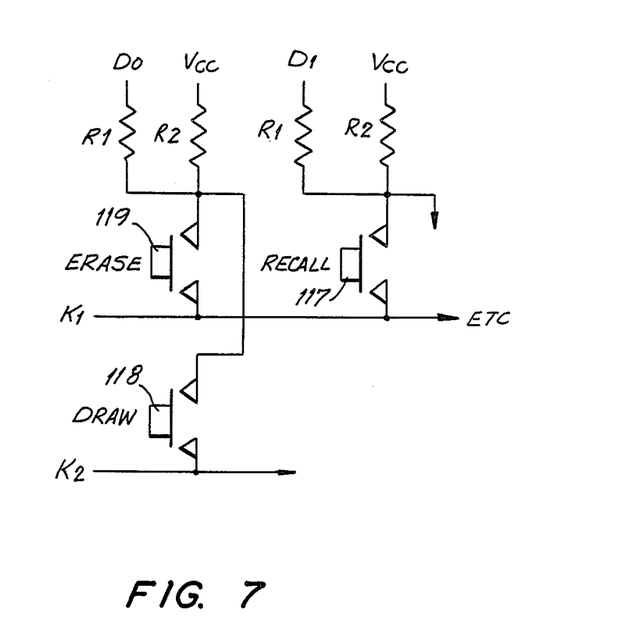
FIG. 7 is a circuit diagram of a portion of the matrix keyboard constructed in accordance with a preferred embodiment of the invention.

To keep the matrix buttons from interfering with each other and with the RAM if two are accidently depressed together, they are further isolated by use of a divided resistor pull-up network. Reference is made to FIG. 7 wherein a circuit diagram of a preferred embodiment of a portion of the 2×4 matrix is depicted. One terminal of ERASE button 119 and DRAW button 117 are connected to the parallel coupling of data line $D_0$ with the series resistor $R_1$. $V_{CC}$ is connected in parallel to the first end of ERASE button 119 and DRAW button 118 through a resistor $R_2$. In a preferred embodiment resistors, $R_1$ and $R_2$ have resistances of 10K and 3.3K Ohms, respectively.

Figure 8A:
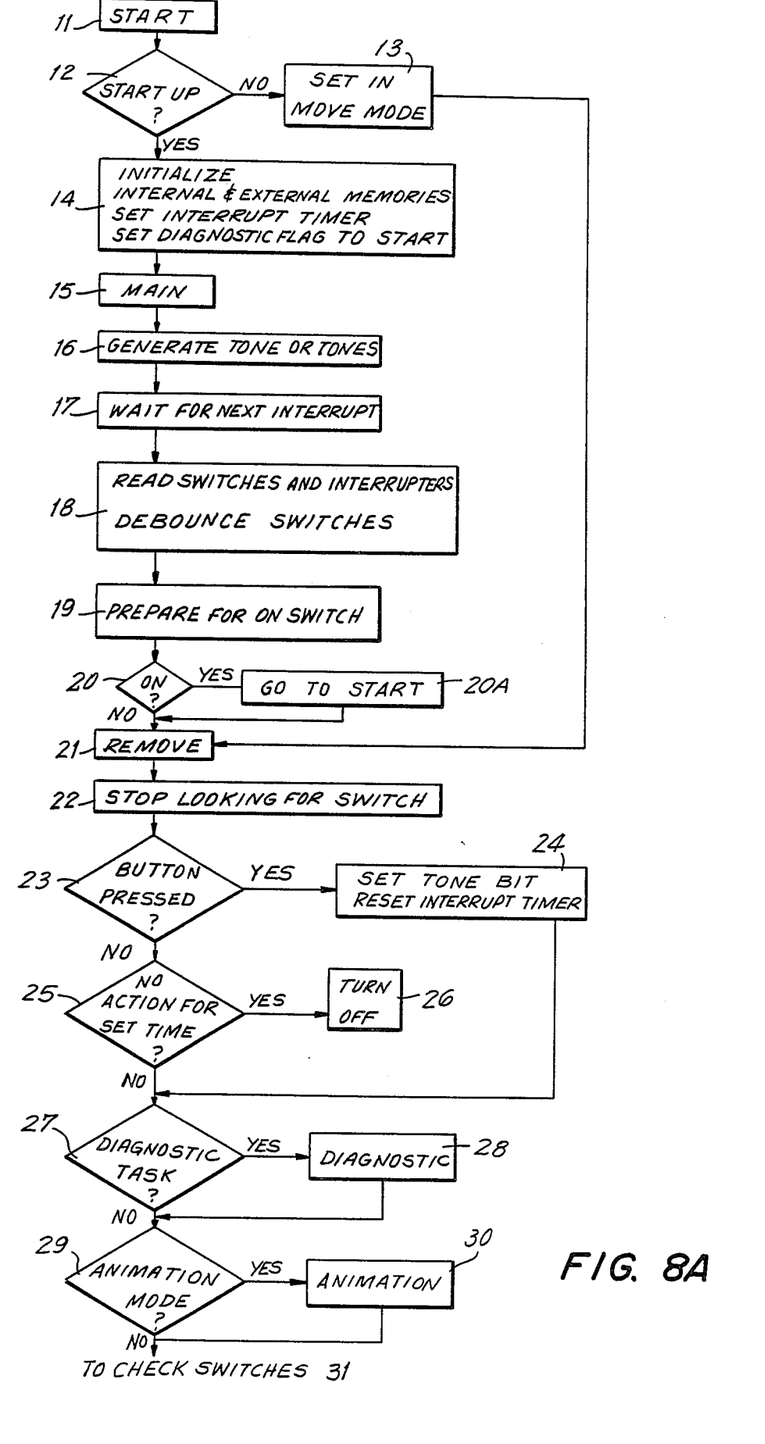
FIGS. 8A and 8B together constitute a functional flow chart diagram of the operation of the electronic sketching device.
Figure 8B:
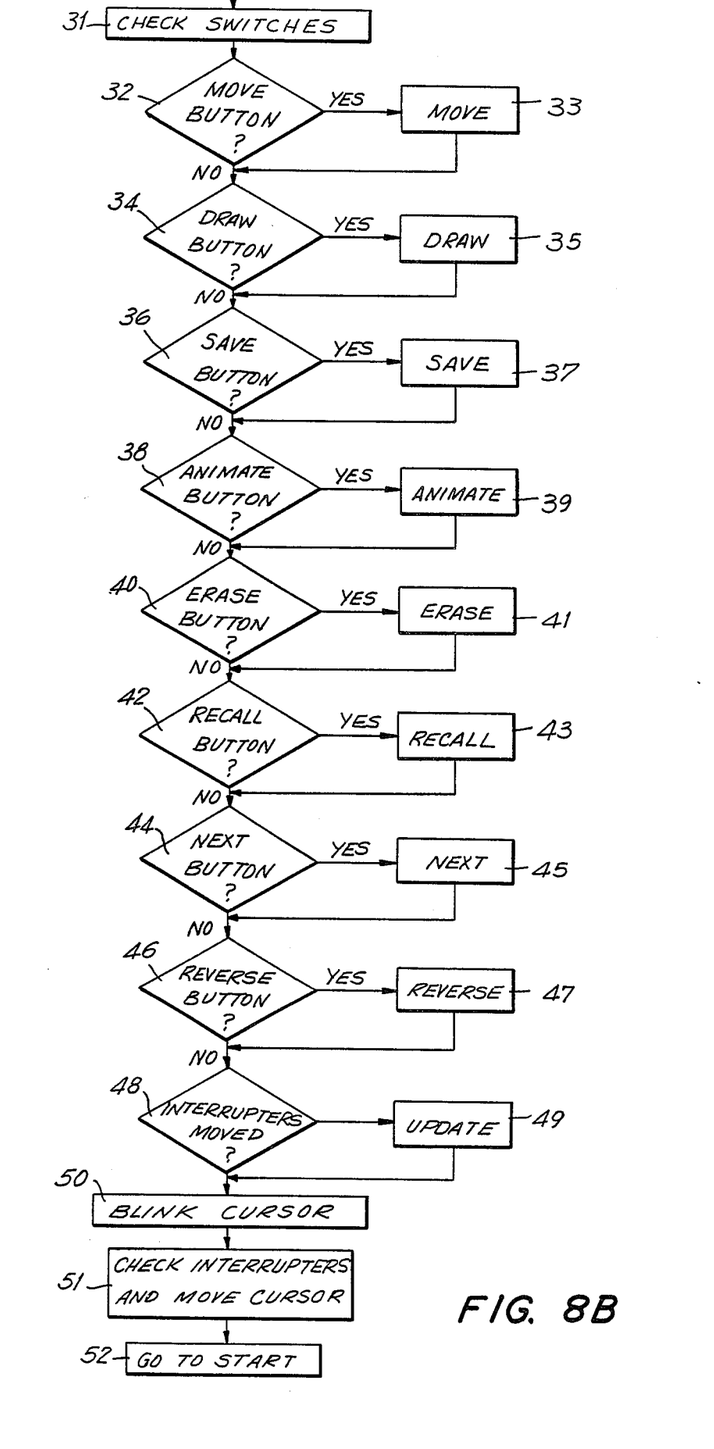

Reference is next made to FIGS. 8A–8B wherein a functional flow chart diagram illustrating the operation of the electronic sketching device constructed in accordance with the invention is depicted. The flow chart begins with a start block 11. Next, a determination is made in block 12 whether or not the electronic sketching device is in the START-UP mode. The START-UP mode is achieved when the electronic sketching device has had no activity within a predetermined period of time, such as three to five minutes, after which the electronic sketching device reverts to a quiescent or OFF mode in which considerable reduction in power usage is achieved. If the electronic sketching device is not in the START-UP mode the CPU is set in the MOVE mode in block 13. In the MOVE mode pressing the MOVE/ON button 112 causes the MOVE function to be implemented. If the electronic sketching device is in the quiescent or OFF mode, pressing the MOVE-/ON button converts the electronic sketching device to its active or ON state. After the CPU is shifted to the MOVE mode in block 13 control shifts to the REMOVE sequence beginning at block 21.

If in block 12 it is determined that the electronic sketching device is in the START-UP mode, control is shifted to block 14 in which the internal and external memories are initialized, and an interrupt timer is set and the diagnostic flag is set to START. The interrupt timer is a software control timer which is incremented at various stages in the flow chart and which converts the electronic sketching device to the OFF state if there is no activity, such as pressing a button, within the predetermined time. The diagnostic flag is a pointer which allows for a series of diagnostic frames to be printed on the screen. The diagnostic screens are useful for quality control testing as well as providing the user with immediate positive feedback that the electronic sketching device is operating. The user sequences through the series of prestored diagnostic screens by repeatedly pressing the NEXT button and can then proceed with sketching.

Next, the control shifts to the beginning of the MAIN procedure in block 15. In block 16 the tone or tones to be output as indications of the button being pressed, or the movement of the cursor by the interrupters, are generated. Next, in block 17, the electronic sketching device waits for the next INTERRUPT to occur. The INTERRUPT procedure refreshes the liquid crystal display. The refresh rate is set at a rate faster than the flicker rate so that an apparently steady display is achieved while allowing for multiplexed driving and time sharing of the data paths. The operation of the INTERRUPT routine is discussed below with respect to FIG. 9. After the next INTERRUPT is received and processed, control shifts to block 18 in which the switches and Interrupters are read by the CPU and the switches are debounced. In block 19 the CPU is prepared for ON switch for the START-UP routine.

Next, in block 20 the program checks to see if the ON button has been pressed. If so, in block 20A the control shifts to START block 11. Otherwise, control proceeds to the beginning of the REMOVE routine in block 21.

In block 22 the CPU stops looking for the ON switch to be pressed. In block 23 the CPU checks to see if a button has been pressed. If a button has been pressed, a tone bit which generates a tone or series of tones is set and the interrupt timer is reset in block 24. The interrupt timer is reset thereby preventing the electronic sketching device from switching to the OFF mode for the predetermined period of time. In this way each time a button has been pressed or the knob/interrupters turned the interrupt timer begins counting down the predetermined time. Only if the predetermined time elapses without a button being pressed does the electronic sketching device shift to the OFF state. Next, control shifts to block 27.

If no button has been pressed control shifts from block 23 to block 25. In block 25 the CPU determines whether any action has been taken for the set or predetermined time. Basically, a determination whether the interrupt timer has elasped is made. If the interrupt timer has run out, indicative of no action for the predetermined time, the control shifts to block 26 where the electronic sketching device shifts to the quiescent or OFF state. The device stays in this state which conserves battery power until the MOVE/ON button is again pressed when control shifts to START block 11. In a preferred embodiment the electronic sketching device uses approximately 60 mW in the active or ON state and only about 600 μW in the OFF state. If there has been user activity in the preset time control shifts to block 27.

In block 27 a determination is made whether a diagnostic test is to be executed. The diagnostic tests are displayed only at START-UP. If the diagnostic tests are indicated the control shifts to the DIAGNOSTIC procedure in block 28. The DIAGNOSTIC procedure prints display frames stored in the internal programming, utilizing the NEXT button to cycle through the various stored diagnostic frames.

If no diagnostic test is present control shifts to block 29 where a determination is made whether the electronic sketching device is in an animation mode. If the electronic sketching device is in an animation mode, in which a sequence of stored frames has been selected, ANIMATION procedure 30 is implemented. ANIMATION procedure 30 selects the saved frames stored in the animation sequence for display on the liquid crystal display screen.

If the electronic sketching device is not in the animation mode control shifts to block 31 (FIG. 8B) where the switches or buttons are checked. In block 32 a determination is made whether the MOVE button has been pressed. If so, control shifts to the MOVE procedure in block 33. The MOVE procedure 33 places the electronic sketching device in the MOVE mode in which the cursor may be moved without drawing on the screen. This has the effect of lifting the "pen" off the paper. In addition, the MOVE procedure checks to determine whether the ERASE button has been depressed, in which case the entire screen is cleared.

If the MOVE button has not been pressed control shifts to block 34 where a determination is made whether the DRAW button has been pressed. If the DRAW button has been pressed control shifts to block 35 where the DRAW procedure is implemented. The DRAW procedure changes the pixel occupied by the positioned cursor to the opposite of the background color (i.e. white to black or black to white). This has the effect of putting the "pen" on the paper. As the cursor is moved by the X or Y positioners up or down, left or right, it leaves a trail of inverted pixels, thus (drawing) lines on the display. DRAW procedure 35 also checks to see if the ERASE button has also been depressed. If so, the line or pixel drawn in this state is erased. The erasure is accomplished by converting each pixel at which the cursor is present back to the background color.

If the DRAW button has not been pressed control shifts to block 36 where a determination is made whether the SAVE button has been pressed. If so, control shifts to the SAVE routine in block 37. The SAVE routine puts the drawing on the screen in a temporary memory so that it can be recalled in a different frame for modification. The SAVE routine also is used to set up the animation sequence. This type of SAVE points to the stored frame in a sequence as many times as the button is depressed. The maximum length of the animation sequence is ninety-six frames. After ninety-six frames have been saved in the animation sequence, no new additions are allowed.

If the SAVE button is not pressed control shifts to block 38 where a check is made for the ANIMATE button. If the ANIMATE button has been pressed control shifts to block 39 where the ANIMATE procedure is performed. The ANIMATE procedure starts the animation or movement of stored frames in the saved sequence. (For example, frame 1 which has been saved twice, frame 2 which has been saved ten times, frame 5 which has been saved once, frame 3 which has been saved once, etc.) At the end of the sequence, up to ninety-six saves, the entire animation will repeat until it is stopped by pressing any of the keys, or the preset system time limit prior to turning the electronic sketching device OFF is reached.

If the ANIMATE button has not been pressed control shifts to block 40 where the determination is made whether the ERASE button has been pressed. If the ERASE button has been pressed control shifts to ERASE routine 41. The ERASE button serves several different functions. If the ERASE button is pressed single pixel erasure using the X and Y positioners is achieved. In addition, an animation sequence erase can be achieved by pressing both the ERASE and ANIMATE buttons, thereby clearing the animation sequence. Finally, an entire frame can be cleared by pressing the ERASE and MOVE/ON buttons at the same time.

In the absence of the ERASE button being depressed control shifts to block 42 where a determination is made whether the RECALL button has been depressed. If so, control shifts to the RECALL procedure 43. RECALL procedure 43 recalls the most recently stored frame image from the memory. Care must be utilized in operating the switch as the information retrieved will replace any present information in the displayed frame.

If the RECALL button has not been pressed control shifts to block 44 which checks to see if the NEXT button has been depressed. If the NEXT button has been pressed, control shifts to the NEXT procedure 45. The NEXT procedure cycles the memory through each frame in sequence. The NEXT button is used to advance to the next frame for changes, deletions, drawing or selecting with the SAVE button for creating animation sequences. There are up to twelve frames available for animation and the button will cycle through all twelve frames whether or not there is a drawing present in each of the twelve frames. An additional frame of temporary memory which stores what is on the screen is not available for animation purposes.

If the NEXT button has not been pressed control shifts to block 46 where a check is made to determine if REVERSE has been depressed. If so, control shifts to a REVERSE procedure 47. This procedure is used to change the frame image to a negative of itself. In other words, if the background is white and the drawing is black, pressing the REVERSE button causes the background to be changed to black while the drawing is changed to white. The reversed image can be saved or altered as in the regular modes. The REVERSE procedure implements the reversing of the image by setting switches for data transfer and selection of an AND or XOR mask which are utilized by the INTERRUPT procedure discussed below with respect to FIG. 9. The electronic sketching device powers up and clears to a normally white background.

If the REVERSE button has not been depressed control shifts to block 48 where a check is made to see if either of the interrupters has moved. If so, an UPDATE procedure 49 is implemented. The UPDATE procedure internally changes the position of the cursor. Next, in block 50, the cursor is blinked to give the user a visual indication of the location of the cursor. Next, in block 51, the movement of the interrupters is again checked and the cursor is moved if appropriate. Finally, in block 52 the control again shifts back to START block 11.

The flow of control described above with respect to the flow chart diagrams of FIGS. 8A and 8B is the normally operative control sequence. However, at regular intervals controlled by timing signals within the CPU an INTERRUPT procedure is initiated. The INTERRUPT procedure refreshes the display and actually reverses the colors of the image when the REVERSE button has been pressed and sets the switches for data transfer and the XOR mask. The time between consecutive INTERRUPT procedures is sufficiently brief so that problems with the flicker rate are avoided. As its name suggests, the INTERRUPT procedure interrupts the main control program, with the main control flow continuing after the INTERRUPT procedure is completed.

Figure 9:
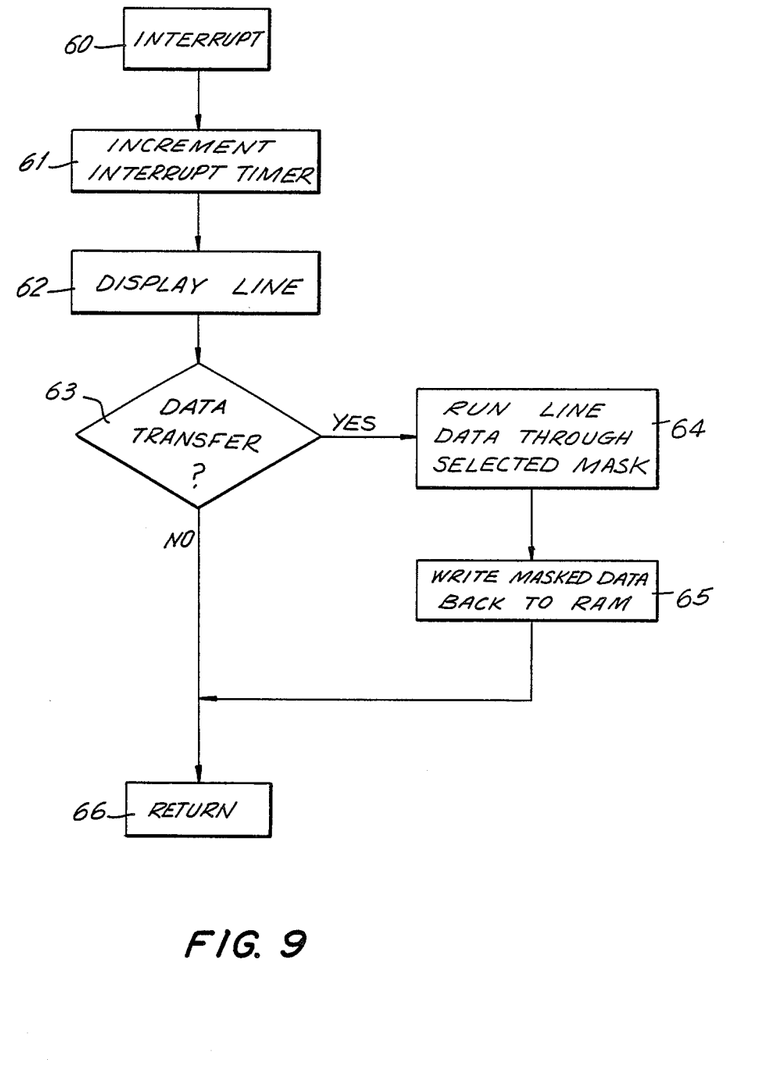
FIG. 9 is a flow chart diagram of the interrupt procedure utilized in the electronic sketching device.

Reference is next made to FIG. 9 wherein a flow chart diagram of the INTERRUPT procedure constructed in accordance with a preferred embodiment of the invention is depicted. The INTERRUPT procedure begins at block 60 and in block 61 increments the interrupt timer. The incrementing of the interrupt timer in block 61 counts off one time interval of the preset time in which the electronic sketching device turns to the OFF state if no buttons are pressed or knobs spun. The interrupt timer may either count up from zero to a preset value in which case the interrupt timer is incremented as in block 61. Alternatively, the interrupt timer can be initialized at a preset value and decremented each time the INTERRUPT procedure is called with the electronic sketching device turning to the OFF state when the interrupt timer reaches zero. Then, the INTERRUPT procedure in block 62 displays the next line to be refreshed. Next, in block 63 a determination is made whether the data transfer switch has been set by the REVERSE procedure. If so, the line data is run through the selected mask (XOR) or (AND). The effect of the AND mask is to leave the data unchanged while running the data through the XOR mask has the effect of inverting the data. Next, in block 65 the masked data is written back to the RAM, replacing the previously stored line pixel information. Finally, in block 66 the INTERRUPT routine terminates and returns to the point in the main control flow in which the interrupt occurred.

When the REVERSE button is pressed there is a one frame delay before the reversed image is displayed. The INTERRUPT procedure in effect displays the old data and updates the frame memory so that the next time the line is displayed the reversed data is displayed on the screen. While the INTERRUPT procedure described above displays one line at a time, it is, of course, possible also to display an entire frame in each INTERRUPT procedure.

The effect of this set up is that there is a main control flow which receives and processes the input from the buttons and knob-interrupter assemblies to manipulate the drawings and animation produced by sequences of these drawings while the actual display is performed by the separate INTERRUPT routine. The timing of the main control and the INTERRUPTS can be and actually are different. The INTERRUPT routine is a periodically triggered routine with the period between calls being less than the time which causes a flicker effect. On the other hand, the main control flow is continuous except for the periods during which the INTERRUPT routine is called.

In practice, a user sitting down to the electronic sketching device would insert the batteries and the unit would turn on. The series of diagnostic screens would then be displayed by repeatedly pressing the NEXT button. Then the user can begin drawing and creating an animation sequence.

The user would either immediately begin drawing by pressing the DRAW button which has the effect of placing the "pen" on the paper (LCD screen), or by lifting the "pen" off the paper by pressing the MOVE button. The cursor is moved with the interrupter knobs. The user creates a drawing on the screen by selected movement of the interrupter knobs either on or off the "paper". Once a drawing is completed the drawing can be saved as one of the frames for use in animation by pressing the SAVE button. The user can then create a completely new drawing by beginning the drawing process starting from a cleared screen or recall a previously drawn screen utilizing the NEXT and RECALL buttons. Then, adjustments, such as reversing the color or making minor changes to a previous drawing can be made, then saving these newly created drawings with the SAVE button. After a number of frames of drawings have been saved an animation sequence can be created utilizing the SAVE button. The ERASE button can be used to erase either a line, frame or the animation sequence. Finally, when the user presses the ANIMATE button the stored animation sequence is repeatedly displayed on the liquid crystal screen.

In a preferred embodiment twelve different frames can be saved and an animation sequence of ninety-six frames repeating the twelve different displays can be created. As noted above, a thirteenth frame in a temporary memory is present which is not available for animation.

When the user is finished with his session on the electronic sketching device having created desired drawings and animation sequences, the electronic sketching device will retain this information as long as the batteries are kept in the sketching device even though the electronic sketching device will shift to the quiescent or OFF state in which the liquid crystal display is not energized. Through the use of low power circuitry such as CMOS circuits the power consumption in the OFF state can be maintained at an extremely low level which allows for extended battery life.

The dimensions and weight of the electronic sketching device constructed in accordance with a preferred embodiment of the invention can be kept small and light, respectively, so that a completely portable electronic sketching device with sophisticated animation capabilities is produced.

The size and scale of the display, processor and memory can be increased to produce larger and more detailed drawings as well as longer animation sequences. The electronic sketching device can also be configured to interface with an external computer system or merely a printer so that data can transferred and a hard copy of the sketch or drawing can be produced.

Accordingly, an electronic sketching device where a sophisticated but simple cursor control using twin knob-interrupter assemblies and containing sophisticated drawing and animation capabilities is provided.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A dedicated portable electronic sketching and animation toy, comprising:

a display device for displaying sketches and animation on a display area;

manually actuatable movement means for moving a cursor on the display area;

storage means selectively coupleable to the display device for storing a plurality of sketches;

sketch control means coupled to the manually actuatable movement means and storage means for selectively storing and erasing the placements of the cursor in the storage means to create and modify a sketch visible in the display area and stored in the storage means;

manually actuatable sketch selection means coupled to the storage means for selecting a stored sketch for display on the display area and modification by the sketch control means and for selecting a stored sketch for addition to a stored sequence of sketches;

manually actuatable sketch copying means for copying a selected stored sketch without erasing said selected sketch from the storage means, for display in the display area and modification by the sketch control means;

animation means for creating and storing a sequence of selected stored sketches coupled to the storage means to enable the display of said sequence of sketches on the display area, the animation means including manually actuatable addition means for adding a sketch selected by the manually actuatable sketch selection means to the stored sequence of sketches, and a manually actuatable means for initiating the sequential display of the stored sequence of sketches on the display means;

power means for receiving a source of electrical energy for powering the toy; and a compact, lightweight housing for supporting the display device, movement means, storage means, sketch selection means, sketch copying means, animation means and power means and adapted to make the toy portable and hand-held;

whereby a dedicated sketching and animation device which functions as a completely portable toy is provided.

2. The electronic sketching device of claim 1 wherein the animation means for creating and storing a sequence of the sketches includes manually actuatable members for selecting a sketch for addition to the sequence and for adding the selected sketch to the stored sequence of sketches.

3. The electronic sketching device of claim 1 wherein the stored sequence of sketches contains more than the total number of the individual stored sketches.

4. The toy of claim 1 wherein the animation means is adapted so that each stored sketch may be selected more than once in the animation sequence.

5. The toy of claim 1 wherein the display means is a liquid crystal display screen.

6. The toy of claim 1, wherein the sketch control means stores placements of the cursor on the display area as pixels and erases cursor placements by changing the stored pixels.

7. The toy of claim 6, wherein the display means is a multi-pixel dot matrix liquid crystal display.

8. The toy of claim 5 wherein the liquid crystal display screen contains a low viscosity medium speed liquid crystal and is reflectively polarized.

9. The toy of claim 1 wherein the means for moving the cursor includes two manually actuatable movement means for moving a cursor on the screen, one of the manually actuatable movement means controlling movement of the cursor along a first axis, the other manually actuatable movement means controlling movement of the cursor along a second axis, at an angle to the first axis, whereby the cursor can be moved to any point on the display area by selective manual actuation of the first and second manually actuatable movement means.

10. The toy of claim 9 wherein each of the manually actuatable movement means includes a knob-interrupter member having an opaque cup with slots regularly spaced about the periphery of the cup, at least one light source on one of the inside and outside of the cup and at least one detector means on the other side of the cup from the light source for detecting the light generated by the at least one light source passing through the slots in the cups as the manually actuatable knob-interrupter member is rotated, the light source and said at least one detector means together defining at least three detection elements, and control means, coupled to the at least one detector means for converting the light received by the detector means associated with the knob-interrupter members into movement instructions for the cursor.

11. The toy of claim 1 wherein the sketch control means includes at least one manually actuatable member for causing one of the storage of the placements of the cursor and non-storage of the placements of the cursor, and processing means coupled to at least one manually actuatable member for implementing the selected storage or non-storage of the cursor placements.

12. The toy of claim 1 wherein the sketch control means includes two manually actuatable members, one of which causes the placements of the cursor on the display area to be stored in the storage means and the other of which causes the placements of the cursor not to be stored in the storage means.

13. The toy of claim 1, wherein the power means is adapted to receive at least one battery.

14. The toy of claim 1, further comprising audio feedback means for producing a sound representative of at least one movement of the cursor, storage of a sketch and the creation and storage of a sequence of the sketches.

* * * * *